United States Patent
Butler et al.

(10) Patent No.: US 7,051,145 B2
(45) Date of Patent: May 23, 2006

(54) TRACKING DEFERRED DATA TRANSFERS ON A SYSTEM-INTERCONNECT BUS

(75) Inventors: Jim Butler, Sierra Madre, CA (US); Khanh Huynh, Baldwin Park, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 392 days.

(21) Appl. No.: 10/125,101

(22) Filed: Apr. 17, 2002

(65) Prior Publication Data

US 2003/0110340 A1 Jun. 12, 2003

Related U.S. Application Data

(60) Provisional application No. 60/339,238, filed on Dec. 10, 2001.

(51) Int. Cl.
*G06F 13/00* (2006.01)
*G06F 13/14* (2006.01)
*G06F 11/07* (2006.01)

(52) U.S. Cl. .................. 710/305; 710/313; 714/48
(58) Field of Classification Search ............. 710/305, 710/39, 112, 313, 315; 714/48, 43, 2; 709/238; 712/225
See application file for complete search history.

(56) References Cited

U.S. PATENT DOCUMENTS

| | | | |
|---|---|---|---|
| 5,388,238 A | 2/1995 | McHarg et al. | |
| 5,504,899 A | 4/1996 | Raz | |
| 5,513,126 A | 4/1996 | Harkins et al. | |
| 5,701,422 A | * 12/1997 | Kirkland et al. ............. 710/310 |
| 5,761,444 A | 6/1998 | Ajanovic et al. | |
| 5,860,119 A | 1/1999 | Dockser | |
| 5,870,567 A | 2/1999 | Hausauer et al. | |
| 6,044,368 A | 3/2000 | Powers et al. | |
| 6,549,964 B1 | * 4/2003 | Lai et al. ................. 710/107 |
| 6,715,004 B1 | * 3/2004 | Grimsrud et al. ........... 710/35 |
| 6,766,386 B1 | * 7/2004 | Dobson et al. .............. 710/39 |

OTHER PUBLICATIONS

"Performance comparison of error control schemes in high speed computer communication networks" by Bhargava, A; Kurose, J.F.; Towsley, D.; Van Ieemput, G. (abstract only) Publication Date: Mar. 27–31, 1988.*
"Throughput performance of memory ARQ schemes" by Kallel, S.; Link, R.; Bakhtiyari, S. (abstract only).*
"SANPower I Solutions," www.bellmicro.com/SANPower/sanpowerI/product_showcase.htm, Feb. 25, 2002.
"The Critical Role of a Host Bus Adaptor (HBA in Storage Area Networks," Emulex Technology Brief, Apr., 2001.
"Storage Area Networking with Fibre Channel," www.emulex.com/products/white/fc/san.html, Feb. 25, 2002.
"Single Server Storage Configuration," www.emulex.com/intel/I_ibod.html, Feb. 25, 2002.
Ajay V. Bhatt, "Creating a Third Generation I/O Interconnect".

(Continued)

Primary Examiner—Gopal C. Ray
(74) Attorney, Agent, or Firm—Morrison & Foerster, LLP

(57) ABSTRACT

Systems and techniques to track deferred data transfers on a system-interconnect bus. A deferral response initiates storage of information corresponding to the response and tracking of progress for a requested data transfer. A master device, such as a bus adapter, may include a split-transaction repository, timers, and a split-transaction monitor. The master device may include both hardware and firmware components, and may be designed to handle split responses as defined by a Peripheral Component Interconnect Extended standard.

19 Claims, 6 Drawing Sheets

OTHER PUBLICATIONS

"How IDE Controllers Work," www.howstuffworks.com/ide2.htm, Apr. 17, 2002.

"Comparative I/O Positioning," Mellanox Technologies, www.mellanox.com/products.

"iSCSI Storage over IP," IBM.com/storage.

"How PCI Works," www.howstuffworks.com/pci1.htm, Apr. 17, 2002.

"PCI–X Addendum to the PCI Local Bus Specification," PCI Special Interest Group, Jul. 24, 2000.

Emulex Product Reference Guide, Jun. 2002, Costa Mesa, CA.

Emulex Web Page: "GN9000/V 1 Gb/s VI/IP © PCI Host Bus Adapter" Features and Description, 2001.

Emulex Web Page: Press Release—"Emulex HBA Selected by Network Appliance For First DAFS–Based Database Storage Solution," Apr. 3, 2002, Costa Mesa, CA.

"SandPower I Solutions," www.bellmicro.com/SANPower/sanpowerI/product_showcase.html, Feb. 25, 2002.

"The Critical Role of a Host Bus Adaptor (HBA in Storage Area Networks," Emulex Technology Brief, Apr. 2001.

* cited by examiner

TRACKING DEFERRED DATA TRANSFERS ON A SYSTEM-INTERCONNECT BUS

CROSS REFERENCE TO RELATED APPLICATIONS

This application claims the benefit of the priority of U.S. Provisional Application Ser. No. 60/339,238, filed Dec. 10, 2001 and entitled "PC1-X SPLIT TRANSACTION".

BACKGROUND

The present application describes systems and techniques relating to receiving data over a system-interconnect bus, for example, receiving data from multiple concurrent data transfers over a parallel system-interconnect bus.

A system-interconnect bus is one or more links through which data is transmitted from one part of a computing system to another. A bus architecture is a collection of links and protocols used to transmit data from one part of a computing system to another. Typically, a bus architecture for a computing system uses multiple bus standards, which can be serial and/or parallel bus standards, to interconnect all the parts used to realize a computing system.

A system-interconnect bus can send data using multiple concurrent data transfers, where a data transfer represents one or more bus transactions associated with each other using a data-transfer identifier. Such system-interconnect busses can also be parallel busses. For example, PCI-X (Peripheral Component Interconnect Extended) is a bus standard that defines a parallel bus architecture for use as a system-interconnect bus in which data is sent using multiple concurrent data transfers.

SUMMARY

The present application teaches tracking of deferred data transfers on a system-interconnect bus. According to an aspect, a deferral response, such as a split response in PCI-X, initiates storage of information corresponding to the response and tracking of progress for a requested data transfer. A master device, such as a bus adapter, may include a split-transaction repository, timers, and a split-transaction monitor. The master device may include both hardware and firmware components.

One or more of the following advantages may be provided. The systems and techniques described may result in a master device accurately tracking the progress of outstanding read requests the master device has issued. The master device need not rely on the target device fulfilling its commitment to respond to the request, as evidenced by a deferral response such as a split response in PCI-X. In addition, the master device can recover from multiple data-transfer errors and identify system errors, thus making the master device more robust and error tolerant. Moreover, the techniques described can provide overall data integrity through the system.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The present application describes systems and techniques relating to receiving data over a system-interconnect bus using deferred data transfers, for example, tracking split-transactions to identify stuck/lost data transfers.

Figure 1A:
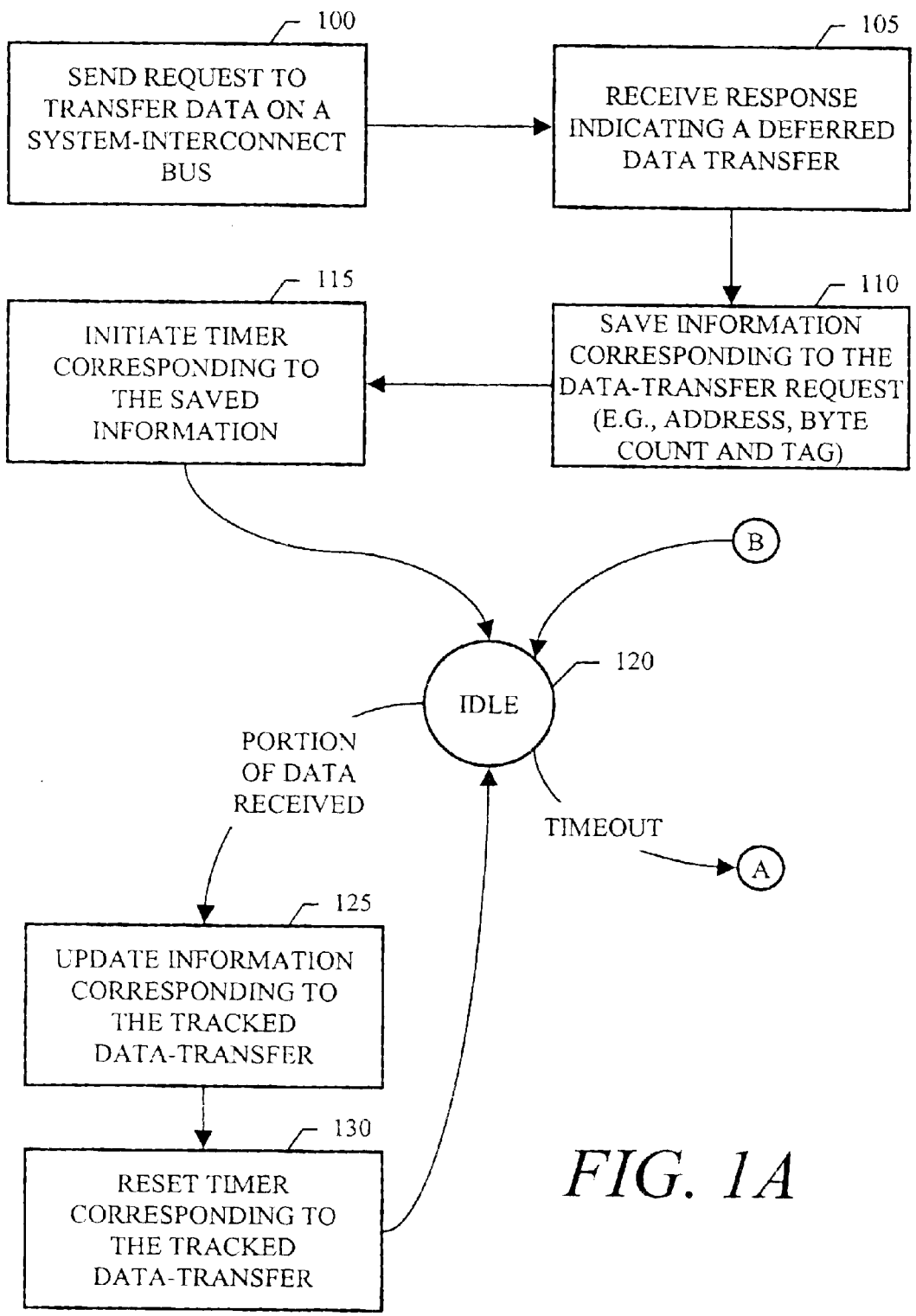
FIGS. 1A and 1B are a combined flowchart and state diagram illustrating tracking deferred data transfers delivered over a system-interconnect bus.
Figure 1B:
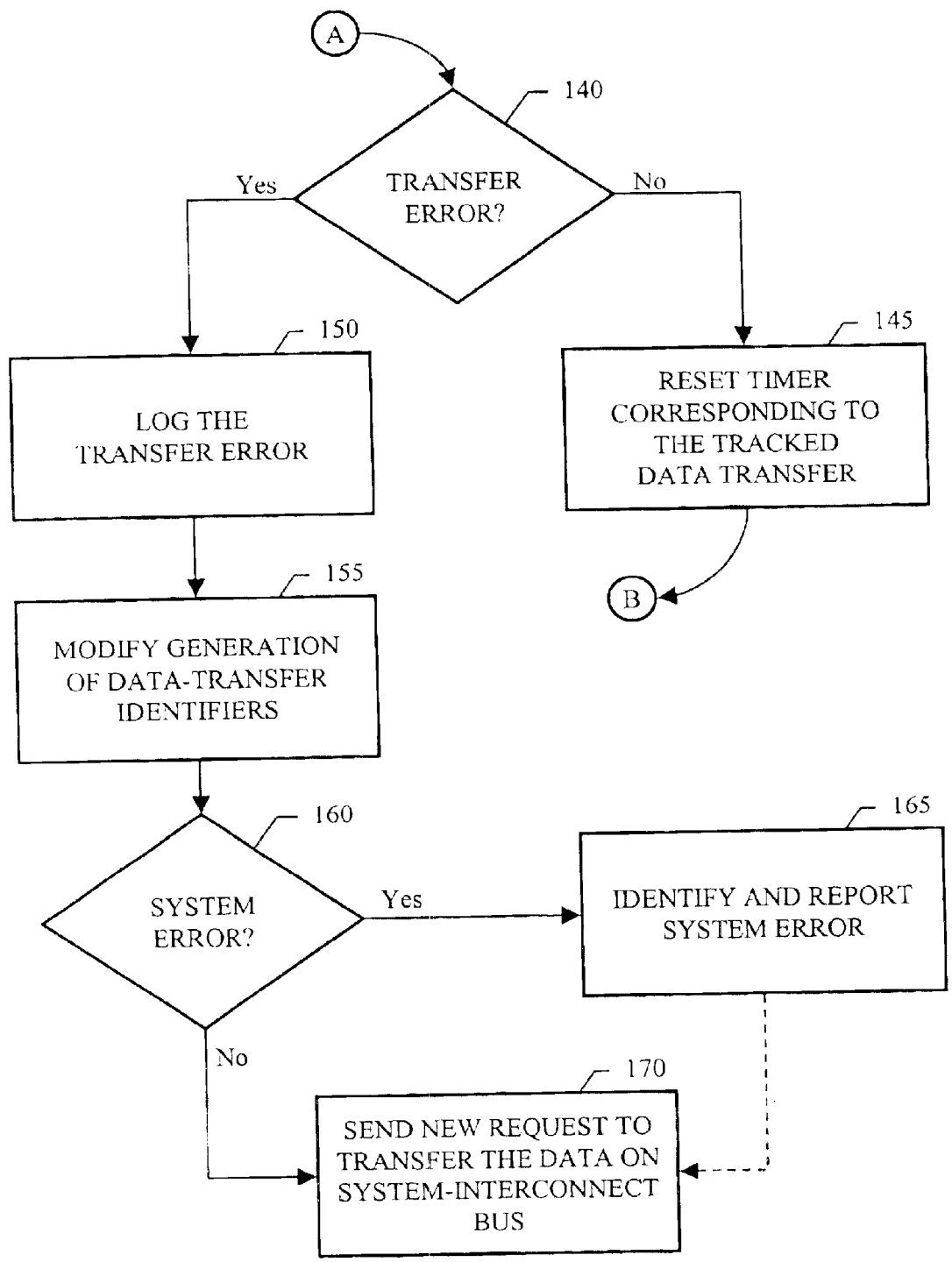

FIGS. 1A and 1B are a combined flowchart and state diagram illustrating tracking deferred data transfers delivered over a system-interconnect bus. A request to transfer data on the system-interconnect bus is sent at 100. The request can be a read request by a master device to read data from a target device. Subsequently, a response is received that indicates a deferred data transfer at 105.

The deferral response indicates that the target device acknowledges the request and can appropriately respond to the request, but will do so at a later time. The deferral response is a commitment to respond to the request at a later time. A data-transfer deferral can be thought of as a split transaction. For example, in PCI-X, a data transfer is known as a sequence. A sequence in PCI-X is one or more data transactions associated with carrying out a single logical transfer by a requester, and originates with a single request.

A deferral response is known as a split response in PCI-X. A split response represents a commitment by a target device to respond to the request at a later time, such as with a split completion or a write transaction. A deferral response is used to initiate a split transaction, which is generally intended to improve bus efficiency when accessing targets that exhibit long latencies. The target of the request responds to the requester by indicating that the requested data transfer will be completed or otherwise responded to at a later time, and thus the requester need not resubmit the request.

Although the terms "data transfer" and "data delivery" are used here to describe the object of the request, these terms refer to data sent in response to any request that can be the subject of a deferral response. These terms are not limited to requests for block or word memory reads, and include generally requests relating to Input/Output (I/O) reads, I/O writes, configuration reads, configuration writes, aliases to memory, and interrupt acknowledgments.

When a deferral response is received, information corresponding to the data-transfer request is saved at 110. Such information can include address, data count, and data transfer identifier information. For example, a starting address, a byte count and a sequence identifying tag can be saved for a PCI-X request to read a block of memory.

Following this, delivery of the data for this data transfer is tracked, such as by initiating a timer for the data transfer that has been deferred at 115. From an idle state 120, two events can trigger further tracking activities. When a portion of data corresponding to the tracked data transfer is received, the information corresponding to this data transfer can be updated, such as by updating address and byte count information at 125. Additionally, the timer corresponding to the tracked data-transfer can be reset at 130.

When a timeout of a timer used for tracking a data-transfer occurs, a check is made to determine if a transfer error has occurred at 140. Identifying a transfer error involves comparing progress for the data transfer with predefined criteria. For example, two or more successive timeouts without any intervening progress in the data transfer can be designated a transfer error. If sufficient progress has occurred since a previous timeout, the timer corresponding to the tracked data transfer is reset at 145. Alternatively, the predefined criteria can specify that a single timeout represents a transfer error, in which case the timeout itself represents identification of the transfer error.

When a transfer error occurs, the transfer error can be logged for future reference at 150. In addition, generation of data-transfer identifiers can be modified, such as by updating an offset at 155. This modification may result in the data-transfer identifier, which corresponds to the data transfer, being withheld from use for a period of time or even being taken out of use entirely.

For example, in PCI-X, data-transfer identifiers may be five bit tags. Although, the five bit tags can be used to identify thirty two ($2^5$) simultaneous ongoing sequences, in typical implementations, fewer than five simultaneous ongoing sequences may be used at any one time. Thus, modification of tag generation can involve updating a tag offset used to generate PCI-X tags. A tag offset may be a stored five bit binary number that serves as the base value from which tags are generated. Updating this tag offset can involve shifting the tag offset or setting the tag offset equal to the lost tag value plus one.

Moreover, when a transfer error occurs, a check may be made to determine if a system error has occurred at 160. The log of transfer errors can be checked to see whether the current transfer error corresponds to a series of transfer errors indicating a problem in the larger system. If so, the system error can be identified and reported at 165. For example, if the same memory location has generated two or more transfer errors, this may be identified and reported to a driver program.

If no system error has occurred, or possibly even if a system error has occurred, a new request to transfer the data on the system-interconnect bus is sent at 170. This new request can use a newly generated data-transfer identifier that is different from all in-use data-transfer identifiers and from the lost data-transfer identifier.

Moreover, conditional checks and procedures can be used to identify and handle a situation in which a lost data transfer reappears at a later time on the system-interconnect bus. For example, lost data that re-appears can be discarded without signaling a catastrophic error to the system. On the bus, the data is transferred and completes normally, but is discarded internally.

Figure 2:
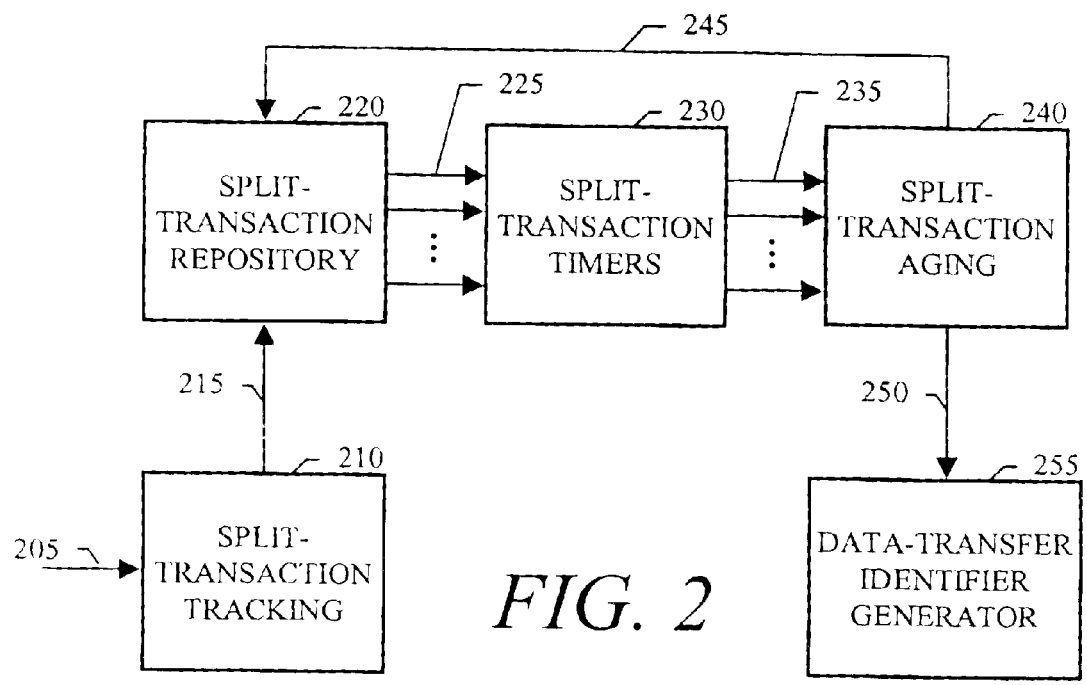
FIG. 2 is a block diagram illustrating components and operational interactions for a system implementing tracking of deferred data transfers delivered over a system-interconnect bus.

FIG. 2 is a block diagram illustrating components and operational interactions for a system implementing tracking of deferred data transfers delivered over a system-interconnect bus. Transactions 205 from a system-interconnect bus, such as a parallel bus and/or a PCI-X bus, are received by a split-transaction tracking component 210. The split-transaction tracking component 210 identifies those transactions that represent new deferred transfers or are part of a currently tracked deferred transfer.

When such transactions are received, an update 215 of a split-transaction repository 220 is performed. In a PCI-X implementation, a split response or a split completion (forward progress on a previously stored split-transaction entry) results in a new entry in the repository or an update of an existing entry respectively. An update involves comparing stored information with the information in the received transaction to determine new information to be stored, such as new address and byte count information based on how much data is transferred.

In addition, error checking can be included. The information in the received transaction can be compared with the stored information to determine if any fields do not match (e.g., matching tags and starting addresses along with mismatching byte counts indicate an error condition). If an error is identified, the error status can be flagged. The data may continue to be transferred, but the data may be thrown away because the integrity of the transaction is in question.

The split-transaction repository 220 can be an array of descriptor entries indexed by data-transfer identifier. The entries in the split-transaction repository 220 have corresponding timers in a set of split-transaction timers 230. When an entry is stored or updated in the split-transaction repository 220, the corresponding timer is reset 225. The timers may be reset to a fixed or a programmable value from which to count down. When one of these timers times out, a split-transaction aging component 240 is notified 235.

The split-transaction aging component 240 receives timeout status and determines the context of the timed-out entry and whether or not to wait longer for the entry to complete. In addition to the number of timeouts discussed above, factors such as extent of progress and type of data transfer can be included in the determination of whether to wait longer. If the aging component 240 determines that the entry is stuck, such as because no progress has been made in a reasonable amount of time, the aging component 240 signals 245 the repository 220 to retire the entry. Additionally, the aging component 240 signals 250 a data-transfer identifier generation component 255 to modify generation of data-transfer identifiers, such as discussed above.

Furthermore, the split-transaction aging component 240 can keep track of the ongoing deferred data transfers to determine if a system error has occurred and/or whether to retry a stuck entry after it is retired. If a portion of memory has generated a series of transfer errors, this may be identified as a system error and reported to a driver program.

The split-transaction repository 220, the split-transaction timers 230, the split-transaction aging component 240 and the data-transfer identifier generation component 255 can be implemented in hardware, software, firmware or combinations of these. In one implementation the split-transaction repository 220 and the split-transaction timers 230 are implemented as logical components of an application specific integrated circuit (ASIC), and the split-transaction aging component 240 and the data-transfer identifier generator 255 are implemented in firmware.

The master device in which these components are implemented may be any device that couples with and issues requests on a system-interconnect bus that supports multiple concurrent data transfers designated by generated data-transfer identifiers. For example, these components may be implemented in a bus adapter, as well as any sort of PCI-X to other bridge device.

Figure 3:
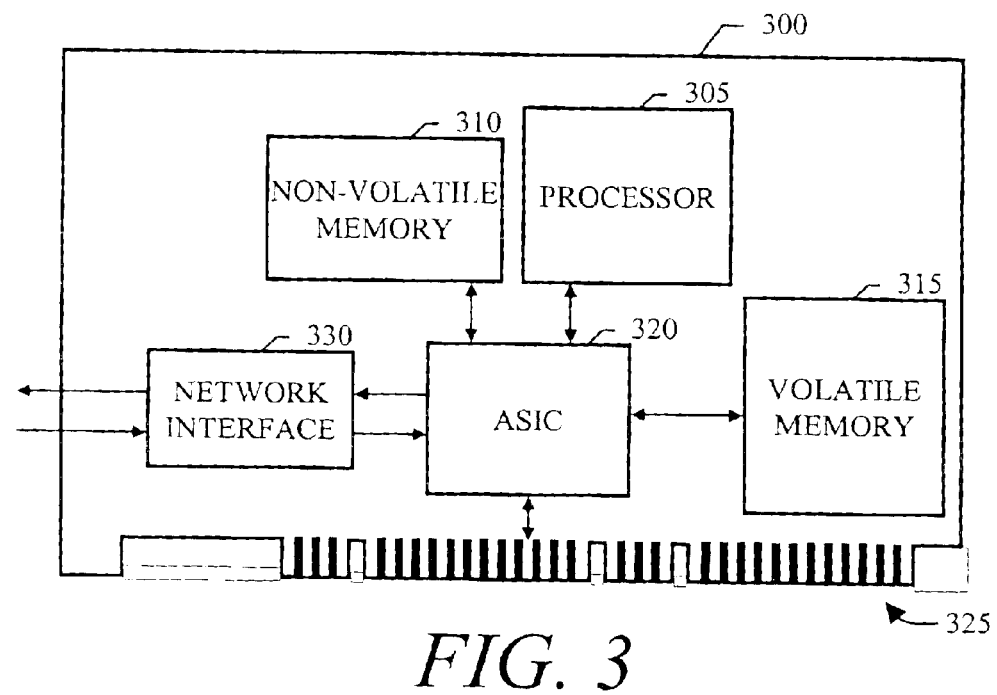
FIG. 3 is a block diagram illustrating a host bus adapter card according to one implementation.

FIG. 3 is a block diagram illustrating a host bus adapter card 300 according to one implementation. The host bus adapter card 300 is configured to be inserted into an existing computing system to provide an interface to a storage area network, providing block-level Input/Output (I/O) services. The host bus adapter 300 includes a processor 305, which can be an SA-110 StrongARM processor, provided by Intel Corporation, located at 2200 Mission College Boulevard Santa Clara Calif. 95052-8119.

The host bus adapter 300 also includes a non-volatile memory 310 and a volatile memory 315. These memories can be used to store instructions for implementing the operations described above. For example, the non-volatile memory 310 plus instructions may represent firmware implementing the split-transaction aging component and the data-transfer identifier generation component.

The non-volatile memory 310 may be a flash memory. The volatile memory 315 may be a high-speed SRAM(Static Random Access Memory)-based memory device, such as a QDR (Quad Data Rate) SRAM with a dedicated read port and a dedicated write port. The volatile memory 315 may be used to store transmit and receive payload data as well as to store network and bus context information and processor data (e.g., code, stack and scratch data).

The host bus adapter 300 also includes a bus adapter ASIC 320. This bus adapter ASIC 320 connects the processor 305, the non-volatile memory 310 and the volatile memory 315 with a system-interconnect bus interface 325 and a network interface 330. The bus adapter ASIC 320 may be implemented using various circuitry components, including random access memory, multiple first-in-first-out (FIFO) memories, including dedicated management circuitry for the FIFO memories, a DMA (Direct Memory Access) arbitrator, which controls access to the system-interconnect bus interface 325, a register bus, and a controller for coordinating and orchestrating the activity of the ASIC 320.

Moreover, the split-transaction repository and the split-transaction timers described above may be implemented in the ASIC 320, and the ASIC 320 can be made to emulate the designs of multiple manufactures to improve interoperability with various components to be connected to the host bus adapter 300.

The system-interconnect bus interface 325 can be configured to connect with a parallel bus, such as a PCI-X bus. The network interface 330 can be configured to connect with a Fibre Channel network.

The bus adapter shown and described above in connection with FIG. 3 is presented as example only. Other bus adapters, as well as entirely different devices, may use the systems and techniques described here.

In general, a bus adapter provides I/O processing and physical connectivity between a data processing system, such as a server, and storage. The storage can be attached using a variety of direct attached or storage networking technologies, such as Fibre Channel, iSCSI (Small Computer System Interface over Internet Protocol), VI/IP (Virtual Interface over Internet Protocol), FICON (Fiber Connection), or SCSI (Small Computer System Interface). A bus adapter provides I/O processing capabilities, which reduces processing loads on a central processor in the data processing system to which the bus adapter is attached.

In contrast, a network interface card typically relies heavily on the central processor of a system for protocol processing, including such functions as maintaining packet sequence order, segmentation and re-assembly, error detection and correction, and flow control. A bus adapter manages entire I/O transactions with little or no involvement of the central processor in a system. In the example host bus adapter shown and described in connection with FIG. 3, the host bus adapter includes a processor, a protocol controller ASIC, and buffer memory to maintain data flow. This host bus adapter takes block-level data from a parallel I/O channel (e.g., PCI-X) and maps it to a routable protocol (e.g., Fibre Channel).

Figure 4:
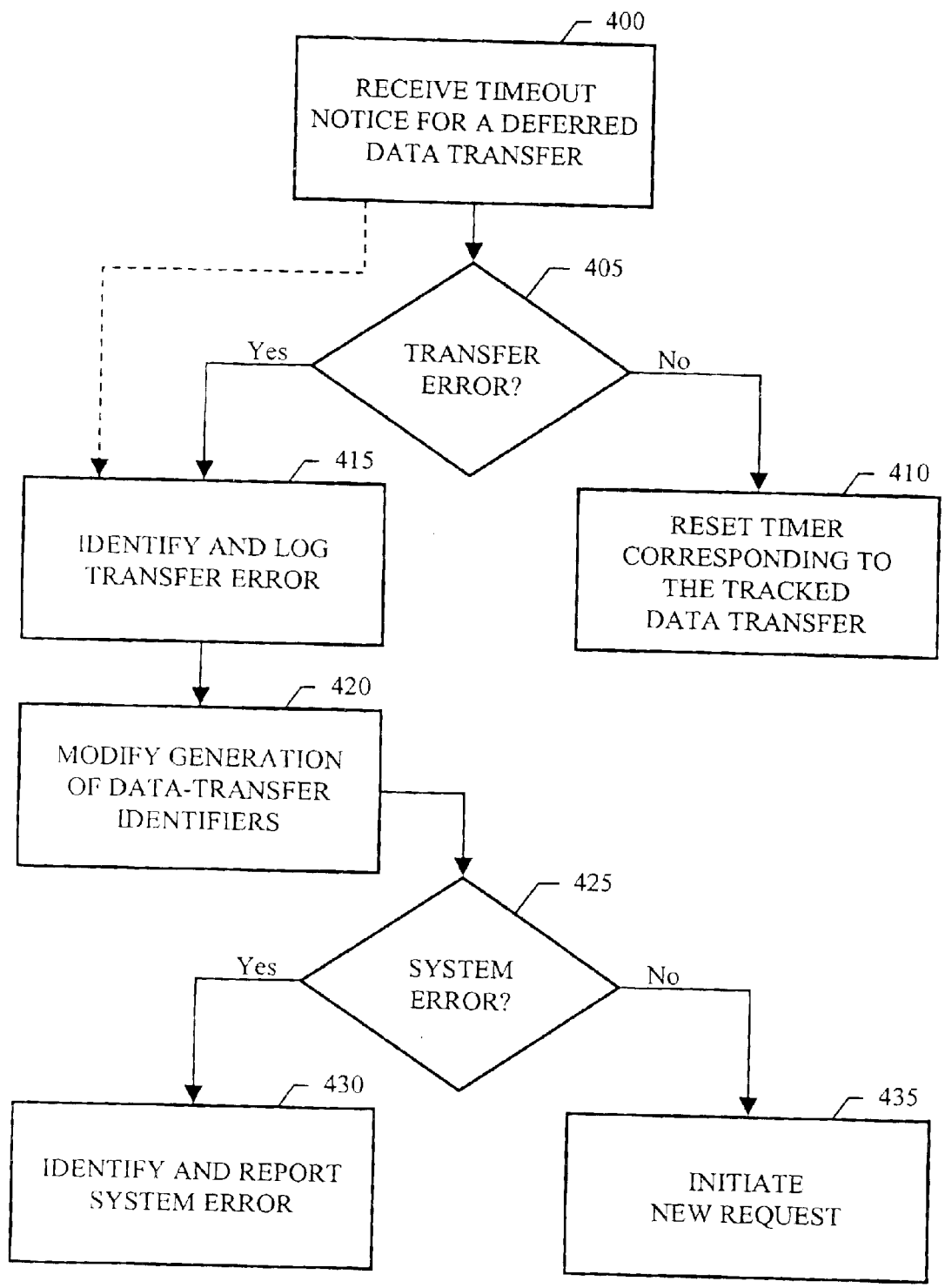
FIG. 4 is a flowchart illustrating tracking of deferred data transfers delivered over a system-interconnect bus.

FIG. 4 is a flowchart illustrating tracking of deferred data transfers delivered over a system-interconnect bus. The operations illustrated in FIG. 4 may be implemented in firmware and function in conjunction with the hardware components described above. A timeout notice for a deferred data transfer is received at 400. With information in the notice, a determination can be made as to whether a transfer error has occurred at 405. Alternatively, the timeout notice itself can be considered indicative of a transfer error as discussed previously.

If no transfer error has occurred, a timer corresponding to the tracked data transfer is reset at 410. If a transfer error has occurred, the transfer error is identified, the entry that triggered the timeout is retired, and the transfer error is logged at 415. Then, data-transfer identifier generation is modified at 420.

A check is then made to determine if a system error has occurred at 425. If so, the system error is identified and reported at 430. If not, a new request is initiated at 435.

Figure 5:
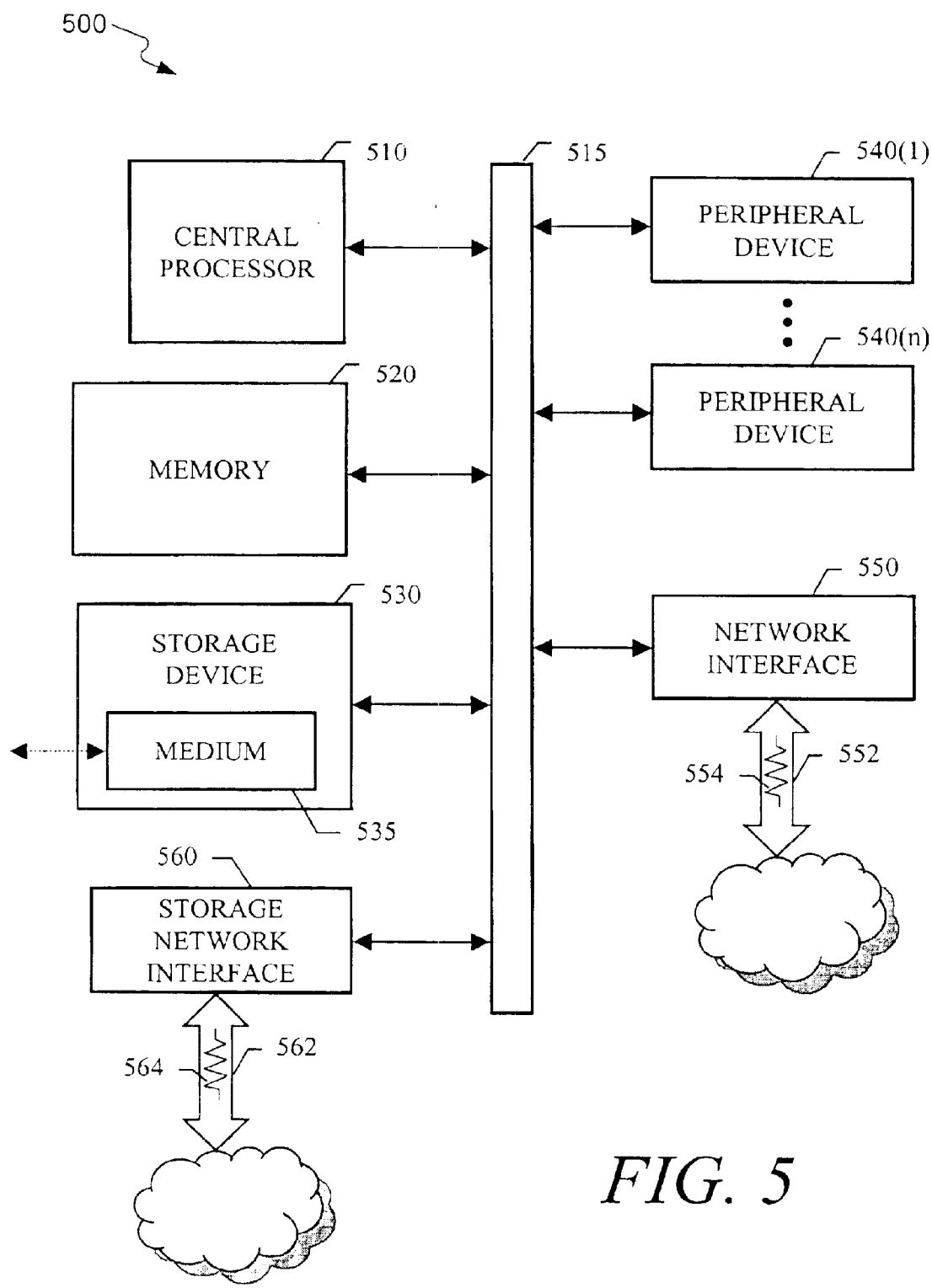
FIG. 5 is a block diagram illustrating an example data processing system.

FIG. 5 is a block diagram illustrating an example data processing system 500. The data processing system 500 includes a central processor 510, which executes programs, performs data manipulations and controls tasks in the system 500. The central processor 510 can include multiple processors or processing units and can be housed in a single chip (e.g., a microprocessor or microcontroller) or in multiple chips using one or more printed circuit boards and/or other inter-processor communication links (i.e., two or more discrete processors making up a multiple processor system).

The central processor 510 is coupled with a system-interconnect bus 515. The system-interconnect bus 515 provides one or more pathways through which data is transmitted among portions of the system 500. The system-interconnect bus 515 can include multiple separate busses, which can be parallel and/or serial busses, bus interfaces, and/or bus bridges. Each bus may have an address bus and a data bus. The system-interconnect bus 515 includes at least one bus architecture that allows data delivery using interleaved multiple concurrent transactions, such as PCI-X, and can further include any other system-interconnect bus architecture (e.g., PCI, industry standard architecture (ISA), extended ISA (EISA), Accelerated Graphics Port (AGP), Universal Serial Bus (USB), SCSI, future bus architectures).

The data processing system 500 includes a memory 520, which is coupled with the system-interconnect bus 515. The system 500 can also include one or more cache memories. These memory devices enable storage of instructions and data close to the central processor 510 for retrieval and execution.

The memory 520 can include a non-volatile memory and a volatile memory. For example, a non-volatile memory can be used to store system firmware, which can be used to handle initialization of the data processing system 500 and loading of an operating system (OS), such as Windows® NT 4.0 Enterprise Edition, provided by Microsoft Corporation, located at One Microsoft Way Redmond Wash. 98052-6399. The volatile memory, which requires a steady flow of electricity to maintain stored data, can be used to store instructions and data once the system 500 starts up.

The data processing system 500 can include a storage device 530 for accessing a medium 535, which is a machine-readable medium containing machine instructions, such as instructions for causing the system 500 or components of the system 500 to perform operations. The medium 535 can be removable and can include a boot media having OS instructions and data that are loaded into the volatile memory when the system 500 boots up. The medium 535 can be read-only or read/write media and can be magnetic-based, optical-based, semiconductor-based media, or a combination of these. Examples of the storage 530 and the medium 535 include a hard disk drive and hard disk platters, which may be removable, a floppy disk drive and floppy disk, a tape drive and tape, and an optical disc drive and optical disc (e.g., laser disk, compact disc, digital versatile disk).

The data processing system 500 can also include one or more peripheral devices 540(1)–540(n) (collectively, devices 540), and one or more controllers and/or adapters for providing interface functions. The devices 540 can be additional storage devices and media as described above, other storage interfaces and storage units, adaptors, input devices and/or output devices. For example, the system 500 can include a display system having a display device (e.g., a video display adapter having components for driving a display, including video random access memory (VRAM), buffer, and graphics engine).

The system 500 also includes a communication interface 550, which allows software and data to be transferred, in the form of signals 554, between the system 500 and external devices, networks or information sources. The signals 554 can be any signals (e.g., electronic, electromagnetic, optical) capable of being received on a channel 552 (e.g., wire, cable, optical fiber, phone line, infrared (IR) channel, radio frequency (RF) channel, etc.). The signals 554 can embody instructions for causing the system 500 or components of the system 500 to perform operations.

The communication interface 550 can be a communications port, a telephone modem or wireless modem. The communication interface 550 can be a network interface card (e.g., an Ethernet card connected with an Ethernet Hub), and may be designed for a particular type of network, protocol and channel medium, or may be designed to serve multiple networks, protocols and/or channel media.

Additionally, the system 500 includes a storage network interface 560, which allows software and data to be transferred, in the form of signals 564, between the system 500 and a storage area network. The signals 564 can be any signals, such as the signals 554, capable of being transmitted and received on a channel 562. The signals 564 can embody instructions for causing the system 500 or components of the system 500, such as the storage network interface 560, to perform operations. The storage network interface 560 can be a host bus adapter, such as shown and described in connection with FIG. 3 above.

When viewed as a whole, the system 500 is a programmable machine. Example machines represented by the system 500 include a server (e.g., a network host) a personal computer, a mainframe, and a supercomputer. The machine 500 can include various devices such as embedded controllers, Programmable Logic Devices (PLDs) (e.g., PROM (Programmable Read Only Memory), PLA (Programmable Logic Array), GAL/PAL (Generic Array Logic/Programmable Array Logic)), Field Programmable Gate Arrays (FPGAs), ASICs, single-chip computers, smart cards, or the like.

Machine instructions (also known as programs, software, software applications or code) can be stored in the machine 500, in a storage area network coupled with the storage network interface 560, and/or delivered to the machine 500 over a communication interface. These instructions, when executed, enable the machine 500 to perform features and function described above. These instructions represent controllers of the machine 500 and can be implemented in a high-level procedural and/or object-oriented programming language, and/or in assembly/machine language. Such languages may be compiled and/or interpreted languages.

As used herein, the term "machine-readable medium" refers to any computer program product, apparatus and/or device used to provide machine instructions and/or data to the machine 500, including a machine-readable medium that receives the machine instruction as a machine-readable signal. Examples of a machine-readable medium include the medium 535, the memory 520, and/or PLDS, FPGAs, ASICS, and the like. The term "machine-readable signal" refers to any signal, such as the signals 554, used to provide machine instructions and/or data to the machine 500.

Figure 6:
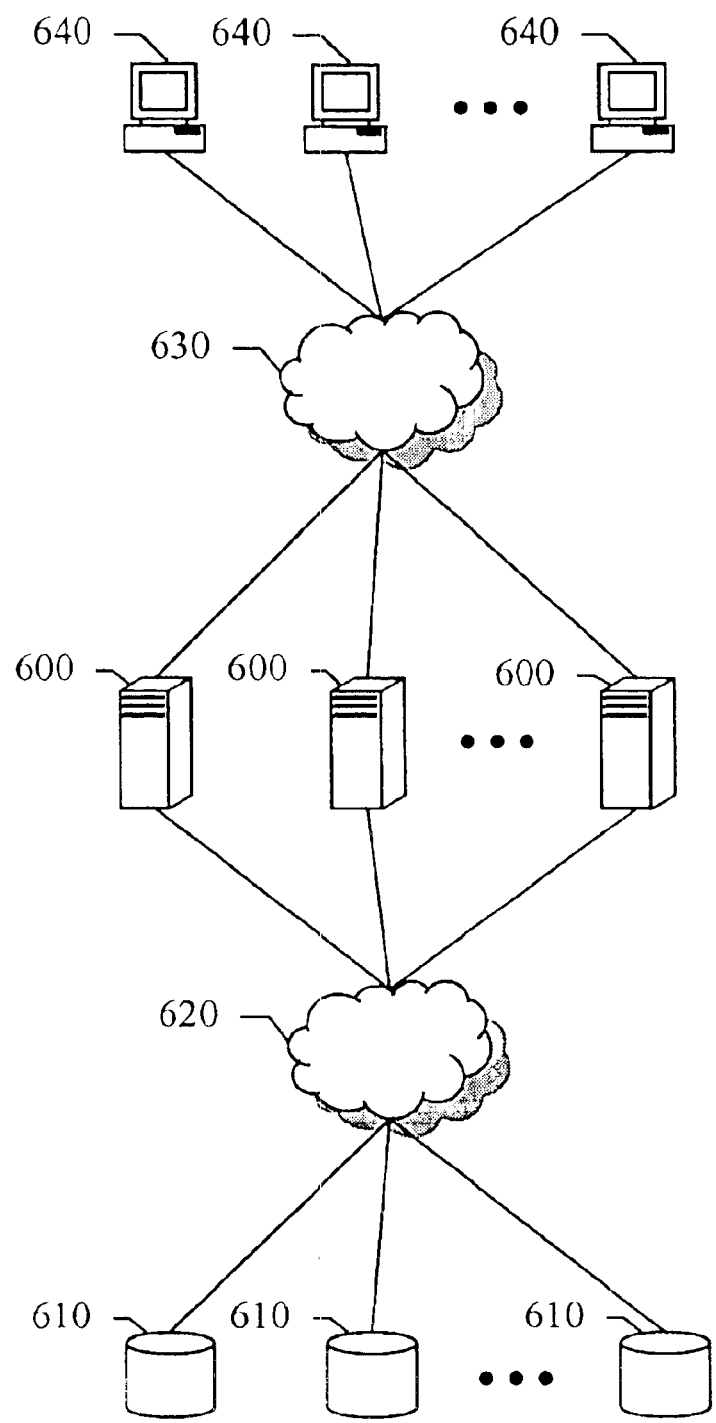
FIG. 6 is a block diagram illustrating an operational environment for a deferred data transfer tracking system according to one implementation.

FIG. 6 is a block diagram illustrating an operational environment for a deferred data transfer tracking system according to one implementation. Multiple servers 600 are connected with a storage area network. Each server 600 can be implemented in the manner shown and described above. For example, a server 600 can be an Intel® AC450NX System with four 550-MHz Pentium® III Xeon™ processors and 1 GB (Gigabyte) RAM, or a server 600 can be an Intel® OCPRF100 System with eight 550-MHz Pentium® III Xeon™ processors and 1 GB RAM.

The storage area network includes multiple storage devices 610 and a storage network 620. The storage network 620 can be a high-speed network dedicated to data storage. For example, the storage network 620 can be a Fibre Channel network, such as a Fibre Channel Arbitrated Loop or a Fibre Channel Switched Fabric. Each storage device 610 can be a storage array using SCSI, PCI-X or other bus architecture, JBOD (Just a Bunch of Disks), a RAID (Redundant Array of Inexpensive Disks) enclosure, or other mass storage device. In general, a storage device 610 includes at least one machine-readable medium as defined above, and the storage area network provides block-level I/O access to the shared storage devices 610 for the servers 600.

Servers 600 are connected with a network 630, which can include multiple machine networks, such as Ethernet networks, IP (Internet Protocol) networks and ATM (Asynchronous Transfer Mode) networks. The network 630 can be a private network, a virtual private network, an enterprise network, a public network, and/or the Internet. The network 630 provides a communication link between multiple clients 640 and the servers 600.

Various implementations of the systems and techniques described here can be realized in digital electronic circuitry, integrated circuitry, specially designed ASICs (application specific integrated circuits), computer hardware, firmware, software, and/or combinations thereof. The various implementations described above have been presented by way of example only, and not limitation. Other systems, architectures, and modifications and/or reconfigurations of devices, machines and systems shown are also possible.

Other embodiments may be within the scope of the following claims.

What is claimed is:

1. A method comprising:
sending a request to transfer data on a system-interconnect bus;
receiving a response on the system-interconnect bus to the data-transfer request, the response indicating an acknowledgment of the data-transfer request and a commitment to respond to the data-transfer request at a later time;

saving information corresponding to the data-transfer request;

tracking progress for the requested data transfer; and identifying a transfer error if the data-transfer progress fails to meet predefined criteria.

2. The method of claim 1, wherein said tracking progress comprises:

initiating a timer upon receipt of the response; and resetting the timer and updating the data-transfer information upon receipt of a portion of the data.

3. The method of claim 2, wherein the data-transfer information comprises an address, a data count and a data-transfer identifier.

4. The method of claim 3, wherein the system-interconnect bus comprises a Peripheral Component Interconnect Extended bus.

5. The method of claim 4, further comprising modifying tag generation in response to an identified transfer error.

6. The method of claim 5, wherein the predefined criteria comprise two timeouts of the timer without a change in the data-transfer information.

7. The method of claim 6, wherein modifying tag generation comprises updating a tag offset.

8. The method of claim 7, further comprising:

monitoring identified transfer errors to identify a system error.

9. The method of claim 8, wherein monitoring identified transfer errors comprises tracking the identified transfer errors to determine when a portion of memory generates a series of transfer errors.

10. A machine-implemented method comprising:

sending a request to transfer data on a parallel bus that supports multiple concurrent data transfers identified by generated data-transfer identifiers;

receiving a response on the parallel bus to the data-transfer request, the response indicating an acknowledgment of the data-transfer request and a commitment to respond to the data-transfer request at a later time;

saving address and data count information corresponding to the data-transfer request;

initiating a timer;

resetting the timer and updating the address and data count information upon receipt of a portion of the data;

identifying a transfer error when the timer times out;

modifying data-transfer identifier generation for transactions in response to an identified transfer error; and monitoring identified transfer errors to identify a system error.

11. The method of claim 10, wherein identifying a transfer error comprises identifying a transfer error when the timer times out without a change in the address and data count information since a previous occurrence of the timer timing out.

12. The method of claim 11, wherein modifying data-transfer identifier generation comprises updating an offset.

13. The method of claim 12, wherein monitoring identified transfer errors comprises tracking the identified transfer errors to determine when a portion of memory generates a series of transfer errors.

14. The method of claim 13, wherein the parallel bus comprises a bus conforming to a Peripheral Component Interconnect Extended standard.

15. A machine-readable medium embodying information indicative of instructions for causing a device to perform operations comprising:

receiving a timeout notice for a bus sequence that began with a split transaction;

identifying a transfer error evidenced by delay in completion of the sequence; and modifying sequence identifier generation in response to an identified transfer error.

16. The machine-readable medium of claim 15, wherein the bus sequence conforms to a Peripheral Component Interconnect Extended bus standard.

17. The machine-readable medium of claim 16, wherein delay in completion of the sequence comprises a timeout of a hardware timer tracking progress for the sequence.

18. The machine-readable medium of claim 16, wherein the operations further comprise:

monitoring identified transfer errors to identify a system error.

19. The machine-readable medium of claim 18, wherein monitoring identified transfer errors comprises tracking the identified transfer errors to determine when a portion of memory generates a series of transfer errors.

* * * * *